(12) United States Patent
Bartkowski

(10) Patent No.: US 6,186,702 B1
(45) Date of Patent: Feb. 13, 2001

(54) ARTIFICIAL REEF

(76) Inventor: Michael Scott Bartkowski, 7419 St. James Pl., Pensacola, FL (US) 32506

( * ) Notice: Under 35 U.S.C. 154(b), the term of this patent shall be extended for 0 days.

(21) Appl. No.: 09/039,210

(22) Filed: Mar. 14, 1998

(51) Int. Cl.[7] ................................................. A01B 61/00
(52) U.S. Cl. .............................. 405/25; 119/207; 119/221
(58) Field of Search ................................. 405/21, 22, 23, 405/25, 29, 30, 31, 24; 119/207, 221; 52/79.1, 79.4, 608, 648.1

(56) References Cited

U.S. PATENT DOCUMENTS

| | | | |
|---|---|---|---|
| 3,704,687 | * 12/1972 | Nohmura | 119/221 |
| 4,031,676 | * 6/1977 | Dally | 52/102 |
| 4,621,588 | * 11/1986 | Harris | 119/241 |
| 5,024,796 | * 6/1991 | Iwasa | 264/69 |
| 5,080,526 | 1/1992 | Waters | 405/29 |
| 5,173,006 | * 12/1992 | Lowe | 405/25 |
| 5,564,369 | 10/1996 | Barber et al. | 119/221 |
| 5,769,027 | * 6/1998 | Adams et al. | 119/238 |
| 5,860,392 | * 1/1999 | Jahren | 119/208 |

FOREIGN PATENT DOCUMENTS

| | | | |
|---|---|---|---|
| 2-308738 | * | 5/1989 | (JP) . |
| 5-137474 | * | 11/1991 | (JP) . |
| 5-236844 | * | 2/1992 | (JP) . |
| 7-274765 | * | 4/1994 | (JP) . |

* cited by examiner

*Primary Examiner*—David Bagnell
*Assistant Examiner*—Sunil Singh
(74) *Attorney, Agent, or Firm*—Carnes, Cona, Dixon

(57) ABSTRACT

An artificial reef that will adequately promote marine growth, marine life, and prevent erosion by providing a unique designed and configuration. The artificial reef is a vertical structure having an enclosed top wall, an opened bottom, and at least three side walls for forming an overall geometrical shape. An opening extends through the enclosed top wall and at least one opening extends through each side wall. This design and configuration will provide an optimum means for water flow and provide adequate and efficient stability of the final structure. This will ultimately prevent damage, roll overs, or the like, even during turbulent weather conditions.

17 Claims, 4 Drawing Sheets

ARTIFICIAL REEF

BACKGROUND OF THE INVENTION

1. Field of the Invention

The present invention relates generally to an artificial reef and more particularly to a versatile artificial reef which will prevent erosion from beaches and shorelines and adequately and efficiently promote marine growth and provide protection and shelter for marine life, principally large fish, lobsters, shrimp, and the like, thereby providing for a balanced reef ecological system for rendering a full spectrum of marine life development. The present invention also provides a means of fabricating a versatile structure which can be used as an artificial reef in fresh or salt water and can be used as barriers in various applications, such as military use, beach and sand dune restoration, when the structure is located above water and on ground.

2. Description of the Prior Art

As is known, through man's abuse and through natural disasters, a significant amount of erosion has occurred among the beaches' natural reef system. These reef systems protect beaches and shorelines from devastating erosion and land loss, act as nurseries for growing fish and provide a critical source of food and income for millions of individuals throughout the world.

As such, several State and Federal funded programs have been initiated to save and inherently increase the reefs' system. One well known program is to sink retired ships or large transport ships into the ocean for consequently forming larger man-made reefs. Though successful, this means of forming a reef tends to be inefficient and very costly and is not performed as frequently as is necessary. As such, other reef systems, on a smaller scale, have been developed for allowing economical installation on a more frequent basis. Unfortunately, these smaller scaled man-made reefs tend to lack structural stability, thus some structures may be destroyed during deployment or may be destroyed upon contact with the underwater surface. Structural stability problems are not only associated with deployment, but also occur with strong sea currents, whether associated with large weather systems or just strong tidal currents. In these situations, the water flow forces the structure to roll and travel along the bottom of the ocean. This type of movement can and has demolished and shattered the smaller scaled man-made reefs, defeating its intended purpose.

Many other types and configurations of smaller scale reef systems have been developed to promote marine life and to prevent erosion. One such device is disclosed in U.S. Pat. No. 5,564,369 issued to Barber et al. In this patent there is disclosed a circular reef system having a plurality of orifices extending therethrough. Though this system may be successful for a short time, it is questionable as to this system's longevity and stability. The round, circular shape appears to be of a shape which will and can promote movement with a natural current or even a tidal currents generally associated with normal current flow. Movement may cause destruction of the artificial reef, consequently defeating its intended purpose.

Yet another artificial reef is disclosed in U.S. Pat. No. 5,080,526 issued to Waters. In this patent there is disclosed an erosion protection unit having a tetrahedral frame comprising six outer elongated members arranged in outline of a tetrahedron, and a triaxial central strut arrangement. Although this device may promote marine growth, this device fails to offer the needed housing and protection necessary to sustain marine life. In addition, this concrete structure is not supported with the use of steel, and as such, may erode in time.

Accordingly, it is seen that none of these previous efforts provide the benefits intended with the present invention. Specifically in providing a system which will adequately and successful promote marine growth, offer shelter to marine life, inhibit erosion of beach and shore lines while being economically feasible and long lasting. Additionally, prior techniques do not suggest the present inventive combination of component elements as disclosed and claimed herein. The present invention achieves its intended purposes, objectives and advantages over the prior art devices through a new, useful and unobvious combination of component elements, which is simple to use, with the utilization of a minimum number of functioning parts, at a reasonable cost to manufacture, assemble, test and by employing only readily available materials.

SUMMARY OF THE INVENTION

The present invention is a versatile artificial reef which adequately promote marine growth, marine life, and prevent erosion by providing a unique designed and configuration.

The artificial reef device of the present invention includes three polygonal side walls, an enclosed top and an opened bottom. When deployed, this opened bottom will contact and engage the sea bottom.

Extending through each side wall is at least one opening. Preferably, the at least one opening is of the shape and size to add increased stability to the device, to provide smooth current flow and dispersion of current forces, and to enable light to extend into the interior of the unit. This will provided several benefits to the present invention including, but not limited to: maintaining the structure in a secured position even through strong water currents and wave conditions; permit more exposure of sunlight into the device and allow a constant exposure to micro-nutrient rich water to inherently promote quicker marine growth and prevent stagnant water; and enable habitat for any array of marine life, regardless of size, and to allow for easing movement in and out of the structure. In addition, to promote this smooth flow, the openings can be tapered.

Optionally, the unit can include shelves, attached either interiorly or exteriorly. These added shelves will provide additional habitat for those species, such as grouper, that prefer overhead shelter or for the attachment of lobster bins. When using lobster bins, they are generally secured along the bottom of the haven.

The three-sided wall extends upward and inward from the opened bottom to the enclosed top. This provides for the walls to be angularly disposed. Such an arrangement will provide the best opportunity for invertebrates to attach given the flow pattern around and through the structure. In addition, the structure renders a smooth transaction between the artificial reef and fishing net and thus prevents snags and entanglements when there is contact.

Angling the walls provides for an overall smooth surface. This particular positioning reduces fluid flow turbulence thereby increasing and enhancing juvenile corals ability to attach and develop into mature coral.

The upper wall is triangular in shape and contacts the three planar side walls. A through hole can extend through this upper wall to offer yet another passage for marine life to explore and to add to stability by permitting fluid flow and reducing upward lifting forces.

This artificial reef can be any size or shape to provide for a structure which is designed and configured to a particular environment. In addition, the smaller scale reef can be located within a larger scale reef to add more dimension and interest to the overall structure and consequently providing for a full balanced reef system.

Structurally, the elements and components are fabricated from steel reinforced concrete to provide for a unit which is structurally sound and long lasting, even when exposed to harsh elements. The natural texture of the concrete will promote invertebrate growth and enable attachment thereto.

The method of fabricating the artificial reef of the present invention includes the steps of providing an inner mold portion. Surrounding the inner mold portion is a structural frame member formed of re-bar. This frame member reinforces the final artificial reef structure, adding to its stability and durability.

Removable opening members are secured to the inner mold member. An outer mold member is placed over and around the inner mold member. A sealing means secures the inner member to the outer member for enabling the opening members to contact both the inner mold and the outer mold. This will allow for the windows to form.

Cement, or the like is inserted between the inner and outer members for forming the final products. Additives can be added to the cement, or the like, for enhancing the final product. Once the cement is cured, the outer member is removed, the opening members are removed, and the formed artificial reef is removed. The design and configuration of the final product provides for an artificial reef which can stacked rendering a compact and efficient mode of transporting and storing the finished product.

Accordingly, it is the object of the present invention to provide for an artificial reef which will overcome the deficiencies, shortcomings, and drawbacks of prior artificial Reefs and methods thereof.

Yet another object of the present invention is to provide for an artificial reef which can stand alone and which includes an adequate amount of surface area to promote and enable marine growth.

Another object of the present invention, to be specifically enumerated herein, is to provide a versatile artificial reef device in accordance with the preceding objects and which will conform to conventional forms of manufacture, be it of simple construction and easy to use so as to provide a device that would be economically feasible, long lasting and relatively trouble free in operation.

Although there have been many inventions related to artificial reefs, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWINGS

Similar reference numerals refer to similar parts throughout the several views of the drawings.

DESCRIPTION OF THE PREFERRED EMBODIMENTS

Figure 1:
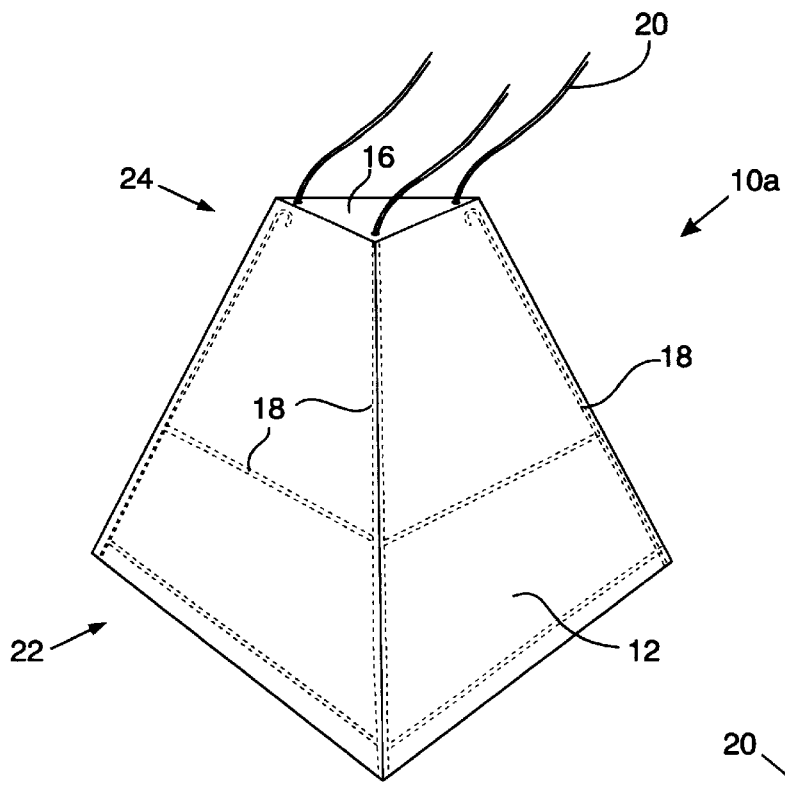
FIG. 1 is an perspective view of the first embodiment of the artificial reef of the present invention.

With reference to the drawings, in particular to FIG. 1 thereof, the first embodiment of the present invention will be described. As seen in this figure, the artificial reef 10a of the present invention is shown to include side walls 12, an opened bottom 14 and an enclosed top 16. The walls 12 are sloped inward from the opened bottom 14 to the enclosed top 16. This will give an overall shape of the present invention 10a to be a substantially vertical structure wherein the top is smaller in surface and overall size than the bottom. As seen in this figure, the structure 10a includes three walls which will inherently form a substantially pyramidal shape. Such a design of having a top which is smaller than the bottom offers an final product with several advantages. One advantage is that this type of configuration will provide for a unit which can be transported and stored efficiently, by enabling a subsequent reef to be stacked on top of a preceding reef. Yet another advantage, more importantly, is that this increase size in the bottom will consequently increase the size of the base for providing a unit which is stable and functionally, regardless of its environment or intended use.

In addition, if the final product is a geometric shape, the preceding artificial reef can be place right side up, while the subsequent artificial reef can be place adjacent to the preceding reef in an upside down position. Thus, the base of the preceding artificial reef will be in contact with the particular surface, while the top portion of the subsequent artificial reef will be in contact with the particular surface. This will provide for a plurality of reefs to form an elongated barrier.

For added ease of transportability, a carrying means 20 is provided on the enclosed top 16. As seen in this figure, the carrying means comprises ropes, which optionally can be tied together to form a loop. This carrying means 20 will enable a hitch or the like to easily lift and transport the unit 10a to any given location or destination.

The inclination of the walls provides a device having a base portion or lower portion 22 which is larger in width and length than that of the upper portion 24. Such an arrangement will provide for a device which is sturdy and which is inherently heavier at the base. This weighted bottom can be beneficial when used in water, since its weighted base will inherently embedded itself into the sea's surface for affixing the artificial reef in a secure position.

In addition, angling the walls provides for an overall smooth structure. This particular positioning reduces fluid flow turbulence, thereby increasing and enhancing juvenile corals ability to attach and develop into mature coral.

To increase the structural strength of the present invention, a reinforced frame 18 (illustrated in outline) is embedded into the final product. The reinforcement occurs on each corner, adding to its stability. Optionally, and as is illustrated, the reinforced frame can be located horizontally across each wall 12.

This first embodiment of the present invention 10*a* is ideal for use in or out of water. Preferably, this embodiment shown is well suited for use out of water and on the ground, by providing an article which can be used as a barrier. Barriers can be used in various applications, such as, but not limited to, military use, beach and sand dune restoration, or the like.

The embodiment described above can be altered to enhance the artificial reef and provide a product particularly suited for use in water. This altered product is illustrated in further detailed in FIG. 2. As seen in this figure, the artificial reef 10*b*, like the first embodiment, includes side walls 12, an opened bottom 14 and an enclosed top 16. The walls 12 are sloped inward from the opened bottom 14 to the enclosed top 16. This will give an overall shape of the present invention 10*b* to be substantially vertical structure which includes a base larger in size than the top. Such an inclination provides a design which will provide for a unit that can be transported and stored efficiently, by enabling a subsequent reef to be stacked on top of a preceding reef. For added ease of transportability, a carrying means 20 is provided on the enclosed top 16. As seen in this figure, the carrying means comprises ropes, which can be tied together for forming a loop. This carrying means enables a fork lift or the like to easily lift and transport the unit 10*b* to any given location or destination.

The upward extension of the walls 12 to the enclosed top 16, as seen, provides the best opportunity for invertebrates to attach given the flow pattern around and through the structure. In addition, the structure renders a smooth transaction between the artificial reef and fishing net and thus prevents snags and entanglements when there is contact.

The overall structure is such that it is vertically disposed and provides for a vertical structure. This vertical structure increases the versatility of the artificial reef 10*b* of the present invention. Since the interior of the unit provides shelter to its inhabitant, the extended vertical height renders an interior which inherently will have varied temperatures at any given level. This natural alternating temperature will offer protection to a wider range of fish species.

Extending through each wall is at least one opening 26. The opening 26 is designed and configured to allow for fish life to travel therein and to provide for fluid flow therethrough. Such an arrangement will offer an access means to the interior of the device, which consequently will provide for adequate shelter to the marine life and will also allow for current flow therethrough and prevent stagnant water. The openings also enable habitat for any array of marine life, regardless of size, and allows easy movement in and out of the structure. In addition this opening is of an adequate size so as to allow for light filtrate therein. The light entering the interior of the artificial reef 10*b* will provide constant light exposure to micro-nutrient rich water to inherently promote quicker marine growth.

The openings and walls, combined, are hydrodynamically designed. The openings and angles of the walls permit water to flow easily and efficiently therethrough. Water flow or current will travel through the device and not on the device. The action of flowing through will prevent the device from tumbling or tipping over due to turbulent current conditions.

To aid in the fluid flow and to provide for a smooth transition through the artificial reef 10*b*, each opening 26 will be tapered inward, as seen via reference numeral 28. This tapering 28 will guide the fluid into and through the reef.

The upper wall 16 contacts the planar side walls 12. A through hole 30 extend through this upper wall 16 to offer yet another passage for marine life to explore and to allow water to flow therethrough. By providing such an opening 30 provides a device which will add stability to the artificial reef 10*b* by permitting fluid flow and reducing upward lifting forces. In summary, the through hole 30 will prevent current from lifting the structure up and off the ground.

It is noted that this through hole and enclosed wall can be eliminated to provide for an overall structure with an opened bottom and an open top. Such a design will provide eliminates steps, costs, and material needed to form the overall artificial reef 10*b*. It is further noted that the vertical structure be solid.

Figure 2:
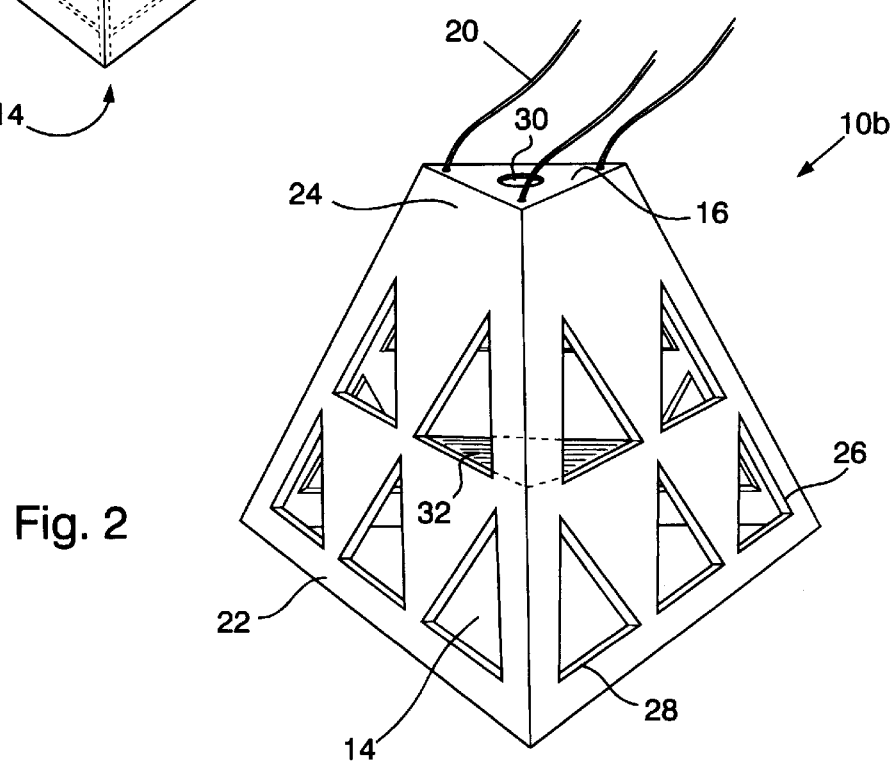
FIG. 2 is a perspective view of the second embodiment of the artificial reef of the present invention.

To increase the structural strength of the artificial reef 10*b*, illustrated in FIG. 2, a metallic frame can be embedded therein, as illustrated in outline in FIG. 1. This will provide for each corner to include a vertical support shaft and may optionally include horizontal support shafts.

Figure 3:
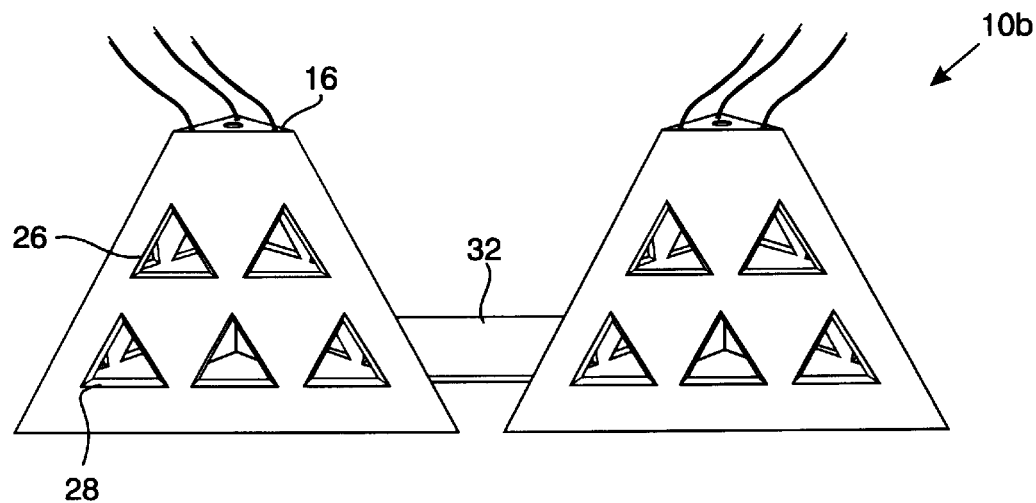
FIG. 3 is a perspective view of a first accessory which can be used with the artificial reef of the present invention.

Optionally, the artificial reef 10*a* or 10*b*, as illustrated in FIGS. 1 and 2, can include accessories for broadening the versatility and usability of the present invention. One accessory is illustrated in further detail in FIGS. 2 and 3. As seen in these figures, the artificial reef can include shelves 32. The shelves 32 can be located either interiorly (as seen in FIG. 2) or exteriorly (as seen in FIG. 3). In the interior position, the shelves 32 can be connected from opening to opening, connecting and bridging the openings. This arrangement offers an interesting arrangement, additional habitat and is desirable by particular species, such as groupers, who prefer overhead shelter. In the exterior arrangement, as seen in FIG. 3, the selves 32 can be used to bridge and couple a series of artificial reefs. The shelves can be made of the same material as the artificial reef. In addition, for more structural stability, each shelf can be reinforced with steel.

For securing the shelves to the openings, conventional attaching means can be used. With the interior arrangement, the self can be added during the fabrication process. Or optionally, in the either arrangements, the selves can include a groove on its underside. This groove will receive the edge of the opening for enabling the shelves to be in a secured and affixed position. Other conventional attaching means can be used, however, such as screws or the like, for securing the shelves to the artificial reef.

Figure 4A:
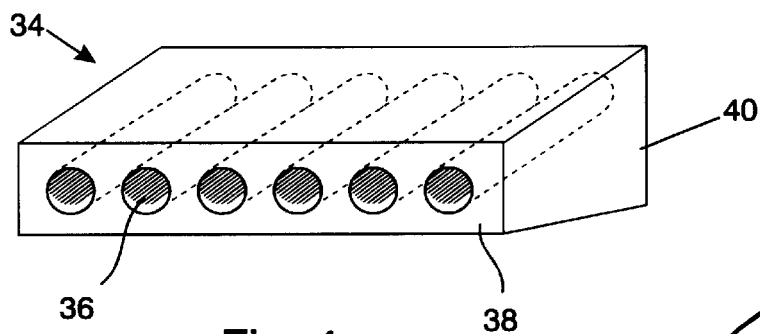
FIG. 4a is a perspective view of another accessory which can be used with the artificial reef of the present invention.
Figure 4B:
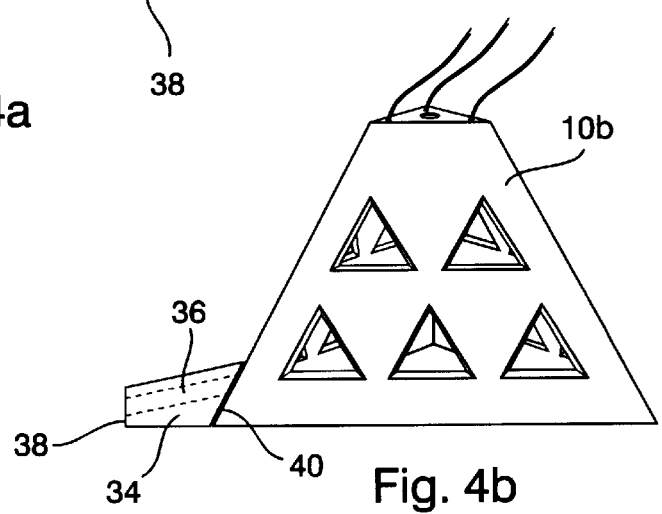
FIG. 4b is a perspective view of the accessory illustrated in FIG. 4a placed next to the artificial reef of the present invention.

Yet another accessory which can be added to the present invention are bins which can abut the artificial reef of the present invention. This accessory is illustrated in further detail in FIGS. 4*a* and 4*b*. As seen this bin 34 comprises a plurality of tunnels 36 extending from the front 38 to the rear 40. The path of the tunnel can be angular, as shown, or straight. The path of the tunnel extend through the bin horizontally. The rear 40 of the bin 34 will contact the front surface of a particular wall of the artificial reef. In order to provide for an adequate fit, the rear 40 is angled. The angled decreases downwardly from the top to the bottom of the bin. This is the opposite from the wall of the artificial reef, inherently providing for an snug and secure fit.

The unique features of the artificial reef of the present invention is such that it reef can be any size or shape to provide for a structure which is designed and configured to a particular environment. Accordingly, the reef of the present invention can be customized to the needs and the desires of the consumer. The artificial reef of the present invention is a fully balanced ecological system and can be designed for any particle body of water and/or for accommodating any species of marine life.

Figure 5:
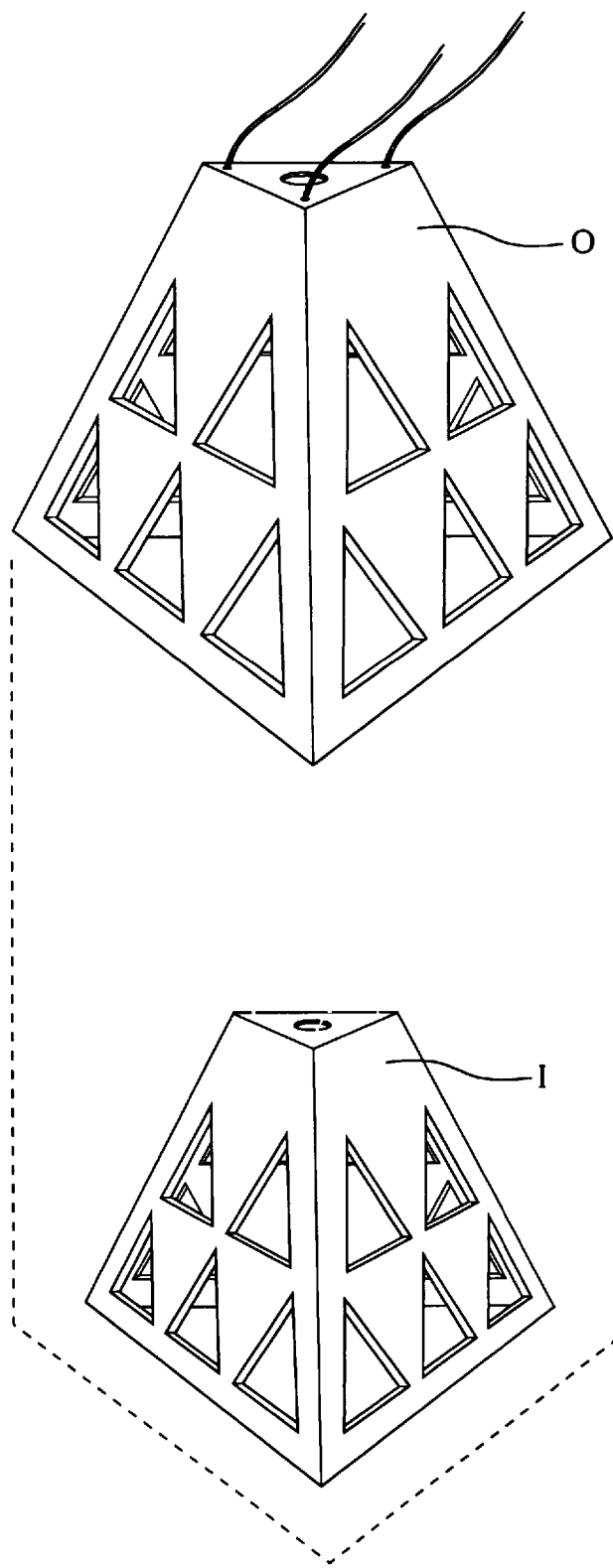
FIG. 5 is a side view of another embodiment of the present invention illustrating a smaller version of the artificial reef located inside a larger artificial reef.

The openings can also be customized to a particular environment so as to provide for an artificial reef with varied amount and sizes of openings. For example, the artificial reef shown in FIG. 2 can be changed by eliminating the lower rows of openings, this will provide for the lower portion to imitate mangos. This type of artificial reef would be ideal for use with harvesting shrimp and/or lobster. In addition, the smaller scale reef can be located within a larger scale reef to add more dimension and interest to the overall structure and consequently providing for a full balanced reef system. This arrangement is shown in FIG. 5. As seen in this figure, an inner artificial reef I will be located interiorly with respect to an outer artificial reef O.

Structurally, the elements and components are fabricated from steel reinforced concrete to provide for a unit which is structurally sound and long lasting, even when exposed to harsh elements. The natural texture of the concrete will promote invertebrate growth and enable attachment thereto.

The stiffest regions of the artificial reef of the present invention lie in the corners. Hence, the corners will include the thickest amount of material, adding to its structural strength and stability. These corners are reinforced with a frame member.

Figure 6:
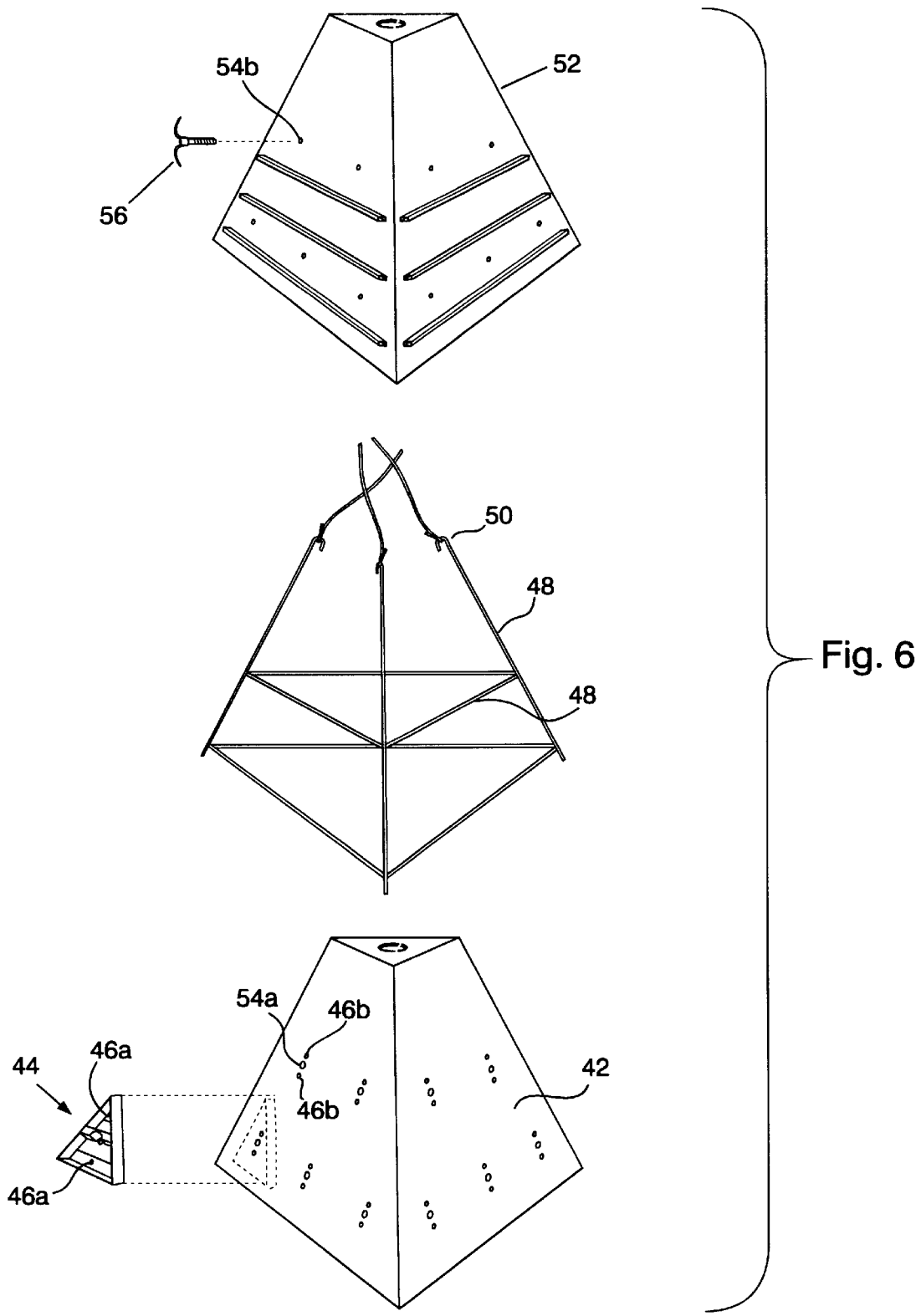
FIG. 6 is an exploded view of the components utilized for forming the artificial reef of the present invention.

The method of fabricating the artificial reef of the present invention is illustrated in further detail in FIG. 6. As seen in this figure, an inner mold 42 is included. The inner mold 42 accepts a removable hole forming member 44. This hole forming member includes an attaching means for attaching it to the inner frame. In this embodiment the attaching means comprises corresponding apertures 46a and 46b, respectfully located in the hole forming member and the inner mold. These holes are alignable and are adapted to receive a threadable pin for providing for the hole forming member to be secured to the inner mold 42.

Surrounding the inner mold 42 is a structural frame member 48 formed of steel, such as re-bar. A steel member 48 will be located at each corned and optionally, can extend horizontally across each wall member. The horizontal members are soldered to the vertical members to provide for an integral frame or skeleton. Located at the top of each corner steel member is a loop or curved portion 50. Secured to this loop or curved portion 50 is a rope structure, or the like, such as nylon or other material which is durable and which will not deteriorate in water. Polymer cable has been used to produce successful results.

An outer mold member 52, as seen, is placed over and around the frame 48 and inner mold member 42. A sealing means secures the inner mold to the outer mold for enabling the hole forming member 44 to contact both the inner mold 42 and the outer mold 52. This will allow for the windows to form. In this embodiment the sealing means comprises threaded apertures 54a located in the inner mold and alignable threaded apertures 54b located in the outer mold 52. A pin 56 or the like is threadably secured therein to force the outer mold towards the inner mold. This will provide for the hole forming member to be sealed against the inner and outer molds. Thereby, preventing cement form entering into the area of the hole forming means.

Cement, or the like, is inserted between the inner and outer molds for forming the final products. The cement extends over the loop or curved members 50 so as to provide a final product wherein no metal is exposed. Additives can be added to the cement, or the like, for enhancing the final product. During the curing process, such as during the summer months, the cement can be re-wetted for increasing the strength of the final product. Once the cement is cured, the outer mold is removed, the hole forming members are removed, and the formed artificial reef is removed. The design and configuration of the final product provides for an artificial reef which can stacked rendering a compact and efficient mode of transporting and storing the finished product.

For deploying the artificial reef of the present invention, a plurality of reefs can be stacked. This convenient stacking method will provides a means of transportation which is efficient and which provides a product that will not occupy valuable space. Consequently, this stacking ability will provide a product which will enable transportation over land and by sea which is less costly and more productive, by allowing more items to be shipped using less room than conventional artificial reefs. Each artificial reef can be carefully to the bottom by a crane ensuring it is placed in its proper place. The artificial reef of the present invention can readily be moved before, during and after deployment through a specially built in carrying means 20, the structure can be moved without touching, disturbing or disrupting the artificial reef or any portion thereof. This carrying means is so ideal so the environment that any marine life that has developed will remain undisturbed through transportation.

EXAMPLES

The following examples are typical artificial reefs which have been utilized and have produced favorable and successful results.

| Artificial Reef | Total Weight of Artificial Reef | Openings Shape/ Number of Openings per Wall/ Dimensions | Side Wall Shape/ Base Length | Height of Reef |
| --- | --- | --- | --- | --- |
| Example 1 (FIG. 2) | 2700 lb. | Triangular/ five openings per wall/ each edge is 20 inches | Trapezoid/ 9 feet | 6 feet |
| Example 2 (FIG. 2) | 900 lb. | Triangular/ five openings per wall/ 7 inches each | Trapezoid/ 3 feet | 2 feet |
| Example 3 One artificial reef located within a second artificial reef (FIG. 5) | Outer Reef: 2700 lb. Inner Reef: 900 lb. | Outer Reef: Triangular/ five openings per wall/ each edge is 20 inches Inner Reef: Triangular/ five openings per wall/ each edge is 7 inches | Outer Reef: Trapezoid/ 9 feet Inner Reef: Trapezoid/ 3 feet | Outer Reef: 6 feet Inner Reef: 2 feet |

RESULTS

The same process was utilized for making each example. Hence, an inner mold, outer mold and skeleton frame were used. The skeleton frame was fabricated from re-bar. The framed comprised of three vertical members, located at each corner, and two cross pieces per side. For the vertical frame member, each top end was bent downward to render a hook. A rope was tied to each hook member. All joints were welded.

Before assembly, all the components were cleaned and thoroughly coated with vegetable oil. The welded skeleton was placed over the inner mold, and adjusted to ensure that it does not contact the inner mold. This will enable all metal to be entirely encased and embedded in concrete.

Each of the internal triangle forms was placed in position by placing a ½ inch pin into matching holes in the inner shell. The outer shell is then positioned over the assembly so that its bottom lip sits squarely inside bottom guides. The entire mold assembly is bolted together.

Reinforced concrete is poured in through the top, and is guided into the recesses of the mold. When sufficient concrete was added, the carrying means, a high strength polymer cable, was secured to each bent end of the cable. The entire top is smoothed to cover all metal.

After a sufficient setup time, the outer mold and the internal forms are removed, and the partially cured "green" product is left on the inner mold to continue curing. When the product has sufficiently cured, it was lifted off the inner shells.

Each product was tested and it was observed that with example 1 and 3, the vertical profile provided a significant vertical relief which attracted pelagic species and larger specimens of typical roof dwellers. The vertical structure allowed fish to migrate vertically in order to more easily find optimum temperature and current conditions—a vertical change of just one foot can often make a significant difference in temperature and speed of the current.

All the examples, provided an exceptional amount of stability. It was observed that the shape enabled more effective use in areas with uneven bottom contours. All of the examples prevented dead areas in that where there would be a lack of current, it created vortices in the current which allowed the nutrients rich water to come in contact with a greater area.

The triangular openings in all of the examples enabled easy passage to marine life, eased water flow, and improved circulation of micro-nutrient rich water across all surfaces. It was further observed that all the openings in all the examples allowed swift currents to pass through the artificial reefs with a minimum amount of resistance, which increased stability, reduced stress on flat surfaces, and minimized the possibility of movement of the structure. The tapered edges of the openings, in the examples, created additional vortices inside the structure to help the flow reach more of the internal surfaces. In addition, in the first example, the openings were of a sufficient size so as to enable light to penetrate therein.

It was further observed that in the third example, where one artificial reef was nested inside a larger artificial reef, an higher number of marine life, as compared to example 1 and example 2, habituated within the artificial reef.

While the invention has been particularly shown and described with reference to an embodiment thereof, it will be understood by those skilled in the art that various changes in form and detail may be made without departing from the spirit and scope of the invention.

I claim:

1. An artificial reef comprising:
    a lower portion and an upper portion;
    said lower portion is larger in size than said upper portion to provide for an gradual decrease in surface area from said lower portion to said upper portion;
    at least one wall extends from said lower portion to said upper portion forming an enclosure and said wall is solid;
    an enclosed top wall is located at said upper portion;
    said at least one wall is fabricated from a water impervious material and said at least one wall is substantially textured and is free from obstructions;
    said at least one wall forms an artificial reef having an integral structure and including a substantial weight for maintaining said at least one wall in an upright and balanced position when in a body of water; and
    a reinforcing frame is embedded in each of said at least one wall for structural stability.

2. An artificial reef as in claim 1 wherein said enclosure is hollow.

3. An artificial reef as in claim 1 wherein said enclosure is solid.

4. An artificial reef as in claim 1 wherein at least one opening extends through said enclosure.

5. An artificial reef as in claim 1 wherein said enclosure comprises at least three side walls.

6. An artificial reef as in claim 1 wherein said impervious material is concrete.

7. An artificial reef comprising:
    a lower portion and an upper portion;
        said lower portion is larger in size than said upper portion to provide for an gradual decrease in surface area from said lower portion to said upper portion;
    at least three walls extend from said lower portion to said upper portion forming an enclosure;
    said enclosure is hollow;
    an enclosed top wall is located at said upper portion;
    at least one opening extends through said top wall;
    a carrying device is embedded within said at least three walls and extends outwardly from said upper portion for enabling transportation even if said enclosure is submerged in water;
    said at least three walls are fabricated from a water impervious material and said at least three walls are substantially textured and are free from obstructions;
    said at least three walls form an artificial reef having an integral structure.

8. An artificial reef as in claim 7 wherein a reinforcing franc is embedded in each of said at least three walls.

9. An artificial reef as in claim 7 wherein at least one opening extends through each of said at least three walls.

10. An artificial reef as in claim 9 wherein said at least one opening extending through each of said at least three walls.

11. An artificial reef as in claim 9 wherein at least one shelf extends from said at least one opening of a preceding wall to said at least one opening of a subsequent wall from said at least three side wall.

12. An artificial reef as in claim 7 wherein said enclosure includes an interior area, a vertical structure having a base and a top, is located within said interior area, said base is larger in surface area than said top of said vertical structure, and said vertical structure is smaller in size than said enclosure.

13. An artificial reef as in claim 7 wherein a lobster accessory abuts at least one of said at least three walls, said lobster accessory comprises a structure having a plurality of through holes extending therethrough.

14. An artificial reef as in claim 7 wherein said impervious material is concrete.

15. An artificial reef comprising:

a first structure having a hollow interior area;

said first structure includes a lower portion and an upper portion and said lower portion is larger in size than said upper portion to provide for an gradual decrease in surface area from said lower portion to said upper portion;

said first structure being fabricated from a water impervious material and having at least one wall and said at least one wall extends from said lower portion to said upper portion forming an enclosure;

said first structure includes an opened lower end; a second structure;

said second structure being smaller in size than said first structure;

said second structure is located within said hollow interior area of said first structure;

said second structure is received within said hollow interior area via said opened lower end; and a reinforcing metallic frame is embedded in said at least one wall of said first structure for structural stability.

16. An artificial reef as in claim 15 wherein said first structure includes at least one opening.

17. An artificial reef as in claim 15 wherein said first structure includes a first geometric shape and said second structure includes a second geometric shape, and said first geometric shape is substantially similar as said second geometric shape.

* * * * *